United States Patent [19]

Frese et al.

[11] 4,048,419
[45] Sept. 13, 1977

[54] PROCESS FOR THE PRODUCTION OF PARTIALLY CRYSTALLINE POLYBUTENE-1

[75] Inventors: Albert Frese; Walter Dittmann; Wolfgang Kilian, all of Marl, Germany

[73] Assignee: Chemische Werke Huls Aktiengesellschaft, Marl, Germany

[21] Appl. No.: 581,117

[22] Filed: May 27, 1975

Related U.S. Application Data

[63] Continuation of Ser. No. 460,904, April 15, 1974, abandoned.

[30] Foreign Application Priority Data

Apr. 14, 1973  Germany .............................. 2318901

[51] Int. Cl.$^2$ .......................... C08F 2/06; C08F 10/08
[52] U.S. Cl. ................................... 526/153; 526/158; 526/349; 526/350; 526/902
[58] Field of Search ................ 260/93.7, 88.2, 94.9 E; 526/158, 153

[56] References Cited

U.S. PATENT DOCUMENTS

| | | | |
|---|---|---|---|
| 3,058,970 | 10/1962 | Rust et al. ........................... | 260/93.7 |
| 3,385,817 | 5/1968 | Jones .................................... | 260/93.7 |
| 3,769,373 | 10/1973 | Reed et al. ........................... | 260/93.7 |

FOREIGN PATENT DOCUMENTS

| | | |
|---|---|---|
| 909,081 | 10/1962 | United Kingdom |
| 884,583 | 12/1961 | United Kingdom |

OTHER PUBLICATIONS

Raff et al., Crystalline Olefin Polymers, Pt. I, Interscience Publ., N. Y., (1965), pp. 366–368.
Modern Plastics, Oct. 1965, vol. 43, No. 2, pp. 94–95, 175.

*Primary Examiner*—Edward J. Smith
*Attorney, Agent, or Firm*—Millen & White

[57] ABSTRACT

Butene-1 optionally in the presence of up to 10% by weight of propene or like comonomer, is polymerized in excess butene-1 or liquid $C_4$ fraction at 60°–120° C. to form a polybutene suitable for forming transparent films by employing as the polymerization catalyst (a) $TiCl_3 \cdot nAlCl_3$ ($n$ = 0.2 to 0.6) and (b) a mixture of 85 – 99.9 molar percent of dialkyl aluminum monochloride and 0.1 – 15 molar percent of trialkyl aluminum.

12 Claims, No Drawings

PROCESS FOR THE PRODUCTION OF PARTIALLY CRYSTALLINE POLYBUTENE-1

This is a continuation of application Ser. No. 460,904, filed Apr. 15, 1974, now abandoned.

BACKGROUND OF THE INVENTION

This invention relates to a process for the production of partially crystalline polybutene-1 especially suitable for the production of transparent films and sheets.

It is known that films of a highly isotactic polybutene-1 have the disadvantages of low transparency, very different strength values in the longitudinal and transverse directions and therefore a poor tear propagation resistance, which render them unsuitable for many fields of application.

The transparency of the polybutene-1 film can be improved only to a minor extent by increasing the atactic proportion. For example, if the atactic proportion is not separated during processing, together with the polymerization solvent, but instead left in the polymerization product by precipitation with alcohol or by evaporation of the solvent, a polybutene-1 is obtained which has only a small improvement in transparency, even in case of ether-soluble proportions of 10–20%. The tear propagation resistance is not improved as compared to the highly isotactic polybutene-1, which property is very different in the longitudinal and transverse directions, for example, 24.8 kp./mm. longitudinally and 0.89 kp./mm transversely.

In U.S. application Ser. No. 400,899, filed Sept. 26, 1973 and German Patent Application No. P 22 47 786.7, the disclosures of which are incorporated by reference, it has been proposed to produce a polybutene-1 useful for film production by means of a controlled polymerization procedure. The process, which is not described in the published prior art, is characterized in that butene-1 is polymerized with diethyl aluminum monochloride, optionally with the addition of 0.1–1.5% by weight, based on the butene-1, of a comonomer in solution in a high-percentage butene-1 and/or in a $C_4$ fraction consisting of butene-1, butene-2 and butane, at temperatures of 60°–120° C., with a mixed catalyst of $TiCl_3 \cdot nAlCl_3$ ($n = 0.2$ to 0.6), obtained by the reduction of titanium tetrachloride with organoaluminum compounds at temperatures of $-10°$ C. to $+30°$ C. and optionally subsequent tempering at temperatures of 70-150° C.

SUMMARY OF THE INVENTION

According to this invention, a partially crystalline polybutene-1 suitable for the production of films, is obtained in a simple and economical manner by polymerizing butene-1, employing as the polymerization catalyst, a mixed catalyst of (a) $TiCl_3 \cdot nAlCl_3$ ($n = 0.2$ to 0.6) and (b) a mixture of 85–99.9 molar percent of a dialkyl aluminum monochloride and 0.1–15 molar percent of a trialkyl aluminum.

DETAILED DISCUSSION

The polymerization is a solution polymerization which is conducted in the presence of excess butene-1 or an inert low-boiling liquid solvent, preferably hydrocarbon, e.g., butane, or the butene-1 can be present in a liquid $C_4$ fraction, e.g., consisting of butene-1 and one or both of butene-2 and butane. The butene-1 is usually present in the starting mixture at a concentration of about 35-98%, preferably at least 50%.

The polymerization optionally can be conducted in the presence of up to 10%, e.g., 0.1–10%, preferably 0.5–5% by weight, based on the butene-1 of a comonomer. Suitable comonomers which optionally can be added to the butene-1 are, for example, the $\alpha$-olefins, e.g., propene, 1-pentene, 1-hexene, 1-octene, dodecene and mixtures thereof, preferably propene.

The $TiCl_3 \cdot nAlCl_3$ (a) component used in the mixed catalyst is preferably obtained by the reduction of titanium tetrachloride with aluminum or with an organoaluminum compound, e.g., alkyl aluminum sesquichloride, dialkyl aluminum monochloride, aluminum trialkyl and aluminum dialkyl hydride, preferably ethyl aluminum sesquichloride. The reduction with ethyl aluminum sesquichloride is preferably conducted at temperatures of $-10°$ to $0°$ C. The titanium trichloride, which now contains 0.2 to 0.6 molar equivalents aluminum chloride, can subsequently be tempered, if desired, at 70°–150° C. The ethyl aluminum sesquichloride is preferably utilized in a 10–30% strength hydrocarbon solution, e.g., a hexane solution. The thus-produced catalyst precipitate can be isolated by decanting and washing with an inert hydrocarbon, e.g., butane or hexane.

A $TiCl_3 \cdot nAlCl_3$ is employed which, contrary to the disclosure of German Pat. No. 1,209,297, is not thermally stable. This $TiCl_3 nAlCl_3$, preferably $TiCl_3 \cdot 0.3$ to 0.5 $AlCl_3$, splits off particularly $AlCl_3$ at temperatures of up to 250° C. and under pressures of 1–760 mm. Hg. A $TiCl_3 \cdot 0.33 \, AlCl_3$, containing Al, Ti, and Cl in an atomic ratio of 1 : 3 : 12, splits off such an amount of $AlCl_3$ at temperatures of up to 250° C. and under pressures of 1–760 mm. Hg, that subsequently there exists an atomic ratio of Al : Ti : Cl of 1 : 4 : 15 to 1 : 4.7 : 16.5.

The $TiCl_3 \cdot nAlCl_3$ precipitate, i.e., the (a) component, is then combined with the mixture of dialkyl aluminum monochloride and trialkyl aluminum, i.e., the (b) component, either prior to mixture with the butene-1 or by separate addition thereto. Alternatively, if the (a) component is produced as described above by the reaction of titanium tetrachloride with ethyl aluminum sesquichloride, the catalyst suspension, which also contains alkyl aluminum dichloride is not separated from the reduction reaction product. Instead, prior to the polymerization, the alkyl aluminum dichloride therein is converted to dialkyl aluminum chloride by adding to the suspension an equivalent excess of trialkyl aluminum, preferably triethylaluminum, thereby producing a mixture of dialkyl aluminum monochloride and trialkyl aluminum, preferably diethyl aluminum monochloride and triethylaluminum, as described, for instance, in Example 2 hereinafter. One mole of trialkyl aluminum per mole of alkyl aluminum dichloride, plus an additional amount required to provide the 1–15 molar percent of trialkyl aluminum in the final catalyst, is employed in the reaction.

The mixed catalysts are employed in a molar ratio of component (b) to component (a) of from 1 to 4:1, preferably about 1.5 to 2.0 : 1. The molar ratio of the diethyl aluminum monochloride to (a) is preferably 1:1 to 1:3, especially 1:1.5 to 1:2.0.

The catalyst is utilized in a concentration of 0.1 – 10 millimoles/liter, calculated on the (a) component.

The required catalyst concentration is dependent on the butene-1 concentration and impurities which interfere in the polymerization, e.g., water, alcohols and other compounds with —OH, —NH$_2$, —NH, —SH groups and butadiene in ppm amounts, which decrease the activity of the catalyst. The ratio of butene-1 to the (a) component of the mixed catalyst is 1000 g. to 25-1000 mg., and preferably 50-250 mg., of (a). The molar ratio of Al : Ti in the final catalyst is preferably 1-3 : 1, especially 1.5-2.5 : 1.

The polymerization is conducted at a temperature of 60°-120° C., preferably 70°-100° C. When comonomers are present and in case of a higher proportion of trialkyl aluminum compounds in the mixed catalyst, the polymerization is advantageously conducted at temperatures of 60°-80° C. At polymerization temperatures of 80°-120° C., preferably no comonomers are used, or only minor quantities thereof, and only a low proportion of trialkyl aluminum compounds is utilized.

Polymerization temperatures higher than 120° C., in the presence of more than 10% by weight based on butene-1 of comonomers and more than 15 molar percent of trialkyl aluminum in the catalyst lead to products having ether-soluble proportions which are too high and which are less suitable, especially for film manufacture. Thus, a higher ether-soluble proportion results in a pronounced tackiness of the films and an undue drop in the yield stress values. The reduction in the yield stress values is particularly great when using larger amounts of trialkyl aluminum compounds. For example, if 20 molar percent or more of trialkyl aluminum is employed, the yield stress values are lowered to about 20-30 kp./cm$^2$.

At lower polymerization temperatures (<60° C.), products are formed which, when processed into films, have poor tear propagation resistance values. Besides, the advantgeous solution polymerization cannot be executed at these temperatures.

The polymerization is conducted at a pressure sufficient to maintain the butene-1 as a liquid at the selected reaction temperature, e.g., 7-25 atmospheres gauge.

The polymerization can be conducted continuously or discontinuously. For purposes of molecular weight control, hydrogen can be employed. The polymerization is preferably conducted to a polybutene-1 concentration in the polymerization mixture of 15-75%, preferably 20-50%. The polymerization can be terminated in any conventional manner, preferably by destroying the catalyst, e.g., with water.

Isolation of the polybutene-1 is conveniently accomplished by venting the reactor, thus volatilizing residual butene-1, which can be collected for re-use, and any other volatiles in the reaction mixture.

Catalyst residue removal is accomplished in the conventional manner.

The partially crystalline polybutene-1 produced by the process of this invention has a density of 0.90-0.91 g/cm$^3$. and an ether-soluble proportion of about 10-30%.

The polybutene-1 produced by the process of this invention is particularly suited for the production of transparent films, e.g., between 0.0005 and 0.25 mm thick, having a good tear propagation resistance, but can also very advantageously be utilized for the production of polybutene-1 sheets and foam materials, as well as generally for injection molding and extrusion processing methods. In general, the product has RSV values of 2.0-5.0 dl./g., preferably 2.5-3.5 dl./g., corresponding to molecular weights of 766,000-2,386,000, preferably 1,020,000-1,554,000. The ether-soluble proportions thereof range between 10 and 30%, usually between 15 and 25%, the yield stress values between 80 and 150 kp./cm$^2$, usually between 90 and 120 kp./cm$^2$, the ultimate tensile strength values are between 160 and 380 kp./cm$^2$, and the ultimate elongation values are between about 300 and 600%. These characteristic values coincide, in part, with the characteristic data of high-pressure polyethylene. As contrasted to high-pressure polyethylene, the partially crystalline polybutene-1 produced according to the process of this invention has substantially higher molecular weights and a higher dimensional stability at high temperatures. The Vicat A temperature of this polybutene-1 is approximately 100 -105° C.; the same value in case of high-pressure polyethylene is approximately 90° C. The tear propagation resistance of a film produced from this polybutene-1 is, for example, longitudinally 10-15 kp./mm. and transversely 20-28 kp./mm. In contrast thereto, films of highly isotactic polybutene-1, as well as of a polybutene-1 brought to the same ether-soluble proportion of 10-30% by a working-up process, show considerably poorer tear propagation resistance values, e.g., longitudinally 0.4-2.2 kp./mm. and transversely 24-28 kp./mm. Films of such products tear in one direction when only a minor stress is applied thereto. The lower resistance to tear propagation can, in these films, be in the longitudinal direction as well as in the transverse direction to the processing direction.

As compared to the high-pressure polyethylene, the polybutene-1 produced according to the claimed process has, in addition to showing a higher thermal dimensional stability, the advantage of improved cold flow, higher penetration, lower gas and water vapor permeability, and also lower dependence of the strength values on the temperature and improved stress crack resistance. Also, the product has an excellent stretch elongation. When specifically stabilized, it is especially suitable for the production of degradable mulching films. The polybutene-1 as manufactured according to the process of this invention can be processed without any problems. Films or other articles from this polybutene-1 can be readily welded.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1 a. Preparation of a TiCl$_3$ . 0.5 AlCl$_3$ Catalyst

One mole of titanium tetrachloride (100%) is added dropwise under agitation within 6 hours to a 20% solution of 1.4 moles of ethyl aluminum sesquichloride (molecular weight 123.7) in hexane, cooled to −5° C. After a post reaction time of 15 hours at 0° to +10° C., the catalyst suspension is annealed for 6 hours at 150° C. Thereafter, the catalyst precipitate is separated and washed twice with hexane. In a practically quantitative yield, 1 mole is obtained of a titanium trichloride catalyst having the composition TiCl$_3$ . 0.54 AlCl$_3$.

b. Polymerization

With the aid of a mixed catalyst of 0.007 part by weight of the above-described TiCl$_3$ catalyst, 0.0102 part by weight of diethyl aluminum monochloride, and 0.00083 part by weight of triethylaluminum, the butene- 1 in 36 parts by weight of butene-1 (98%) is polymerized at 75° C. after adding 0.0002 part by weight of hydrogen and under a total pressure of 10 - 8 atmospheres gauge. After a polymerization period of 6 hours, the polymerization is stopped by adding 0.1 part by weight of steam. By a simple expansion of the polybutene solution, 19 parts by weight of a polybutene-1 is obtained having the following characteristic values:

| RSV | 4.0 dl./g. | $\overline{M}v$: 1,830,000 |
|---|---|---|
| $MI_{190/5}$ | 1.2 g./10 min. | calculated according to the solution viscosity |
| Density | 0.9074 g./cm³ | |
| Ether extract | 22.8% | |
| Yield stress | 124 kp./cm² | |
| Ultimate tensile strength | 268 kp./cm² | |
| Eltimate elongation | 376% | |
| Vicat A | 107° C. | |

Oriented film (0.05 mm. thick) produced from this material has the following characteristic data:

| Yield stress | longitudinal | kp./cm² | 218 |
|---|---|---|---|
| | transverse | kp./cm² | 190 |
| Elongation at yeild point | longitudinal | % | 16 |
| | transverse | % | 16 |
| Ultimate tensile strength | longitudinal | kp./cm² | 354 |
| | transverse | kp./cm² | 276 |
| Ultimate elongation | longitudinal | % | 223 |
| | transverse | % | 340 |
| Tear propagation resistance | longitudinal | kp./mm. | 14.2 |
| | transverse | kp./mm. | 25.1 |
| Impact strength test | longitudinal | kp.cm./cm² | 1025 |
| | transverse | kp.cm./cm² | 1076 |
| Notch impact strength test | longitudinal | kp.cm./cm² | 228 |
| | transverse | kp.cm./cm² | 234 |
| Penetration | | kp. | 26.7 |
| Welding factor | | | 0.6 |

EXAMPLE 2 a. Production of a TiCl₃ . 0.5 AlCl₃ Catalyst Suspension

One mole of titanium tetrachloride (100%) is added dropwise under agitation within 6 hours to a 20% solution of 1.4 moles of ethyl aluminum sesquichloride (molecular weight 123.7) in hexane, cooled to −5° C. For a post reaction, the catalyst suspension is stirred for 15 hours at 0–10° C. and then annealed for 6 hours under agitation at 140° C.

Into a 2 m³ capacity agitator-equipped pressure vessel is charged at a temperature of 70° C., 600 parts by weight of a C₄ cut containing 54% of butene 1, 23% of trans-butene-2, 15% of cis-butene-2 and 8% of butane. The catalyst suspension produced according to Example 2(a) is added thereto, along with 1.1 moles = 0.1254 part by weight of triethylaluminum.

The polymerization is conducted at 70° C., under a partial hydrogen pressure of 0.1 atmosphere and a total pressure of 8-7 atmospheres gauge. After a polymerization period of 10 hours, 10 parts by weight of water is added under agitation. After expansion, 263 parts by weight of a polybutene-1 is obtained having the following characteristic values:

| RSV | 2.7 dl./g. | $\overline{M}v$: 1,122,000 |
|---|---|---|
| $MI_{190/2.16}$ | 0.9 g./10 min. | |
| $MD_{190/5}$ | 6.4 g./10 min. | |
| Density | 0.9052 g./cm³ | |
| Ether extract | 19.2% | |
| Yield stress | 103 kp./cm² | |
| Ultimate tensile strength | 296 kp./cm² | |
| Ultimate elongation | 410% | |
| Vicat A | 105° C. | |

EXAMPLE 3

Employing a mixed catalyst of TiCl₃ . 0.33 AlCl₃ catalyst (commercially available aluminum-reduced titanium trichloride), 0.0108 part weight of diethyl aluminum monochloride, and 0.0002 part by weight of triethyl-aluminum, the butene-1 in 36 parts by weight of butene-1 (98%) is polymerized at 80° C., after adding 0.0005 part by weight of hydrogen, under a pressure of 12–8 atmospheres gauge. After a polymerization period of 8 hours, the reaction is stopped by adding 0.1 part by weight of steam. By simple expansion of the polybutene-b 1 solution, 20 parts by weight of a polybutene-1 is obtained having the following characteristic values:

| RSV | 3.4 dl./g. | $\overline{M}v$: 1,499,000 |
|---|---|---|
| $MI_{190/2.16}$ | 0.5 g./10 min. | |
| $MI_{190/5}$ | 3.3 g./10 min. | |
| Density | 0.9046 | |
| Ether extract | 13.9 | |
| Yield stress | 95 kp./cm² | |
| Ultimate tensile strength | 258 kp./cm² | |
| Ultimate elongation | 356% | |
| Vicat A | 102° C. | |

EXAMPLE 4

Employing a mixed catalyst consisting of 0.012 part by weight of the TiCl₃ catalyst prepared as set forth in Example 1(a), 0.024 part by weight of diethyl aluminum monochloride, and 0.00025 part by weight of triethyl-aluminum, the butene-1 in 40 parts by weight of a C₄ cut containing 52% of butene-1, 24% of trans-butene-2, 16% of cis-butene-2 and 8% of butane is polymerized at 90° C. and under a pressure of 15–10 atmospheres gauge. After a polymerization time of 12 hours, the polymerization is stopped by adding 0.2 part by weight of steam. After expansion, 18 parts by weight of a polybutene-1 is obtained having the following charcteristic values:

| RSV | 3.0 | $\overline{M}v$: 1,280,000 |
|---|---|---|
| $MI_{190/2.16}$ | 0.5 | |
| $MI_{190/5}$ | 3.4 | |
| Density | 0.9050 | |
| Ether extract | 18.6% | |
| Yield stress | 98 kp./cm² | |
| Ultimate tensile strength | 297 kp./cm² | |
| Ultimate elongation | 415% | |

EXAMPLE 5

Employing a mixed catalyst of 0.006 part by weight of the titanium trichloride catalyst produced in Example 1, 0.012 part by weight of diethyl aluminum monochloride, and 0.00025 part by weight of triethylaluminum, the butene-1 in 20 parts by weight of butene-1 (98%) and 1 part by weight of propene (99%) is polymerized at 70° C. and under a pressure of 9–7 atmospheres gauge. After a polymerization period of 5 hours, the unreacted butene-1 and propene are expanded. In this way, 11 parts by weight of a butene-1 - propene copolymer is obtained having the following characteristics:

| | | |
|---|---|---|
| RSV | 3.2 | $\bar{M}v$: 1,390,000 |
| MI$_{190/5}$ | 3.3 g./10 min. | |
| Ether extract | 21.2% | |
| Yield stress | 92 kp./cm$^2$ | |
| Ultimate tensile strength | 310 kp./cm$^2$ | |
| Ultimate elongation | 426% | |

EXAMPLE 6

A polymerization is conducted at 70° C. and under a pressure of 9-7 atmospheres gauge in a mixture of 30 parts by weight of a C$_4$ cut of 48% of butene-1, 22% of trans-butene-2, 14% of cis-butene-2, and 16% of butane and 1.0 part by weight of a propene-propane mixture with a propene content of 60%, employing as catalyst 0.01 part by weight of TiCl$_3$ . 0.3 AlCl$_3$ (commercial aluminum- reduced TiCl$_3$), 0.017 part by weight of diethyl aluminum monochloride and 0.0002 part by weight of triethylaluminum. After a polymerization period of 10 hours and after expansion, 10.5 parts by weight of a butene-1 - propene copolymer is produced having the following characteristic values:

| | | |
|---|---|---|
| RSV | 2.9 dl./g. | $\bar{M}v$: 1,335,000 |
| MI$_{190/5}$ | 3.1 g./10 min. | |
| Ether extract | 17.5% | |
| Yield stress | 104 kp./cm$^2$ | |
| Ultimate tensile strength | 247 kp./cm$^2$ | |
| Ultimate elongation | 353% | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of partially crystalline polybutene-1 formable into transparent sheets and films which comprises:
    i. solution polymerization at 60°-120° C. of 35-98% of butene-1, based on the starting mixture, in excess butene-1 or an inert, low-boiling liquid C$_4$ solvent consisting of butene-1 and one or both of butene-2 and butane, employing as the polymerization catalyst a mixed catalyst consisting essentially of (a) a thermally unstable TiCl$_3$ . $n$ AlCl$_3$ ($n$ = 0.2 to 0.6) and (b) a mixture of 85-99.9 molar percent of a dialkyl aluminum monochloride and 0.1-15 molar percent of a trialkyl aluminum in a molar ratio of component (b) to component (a) of from 1 to 4:1; and thereafter
    ii. volatilizing the polymerization solvent and recovering the residue containing both the ether soluble and etherinsoluble fractions as the polymerizate.

2. A process according to claim 1 wherein the polymerization is conducted in the presence of a comonomer.

3. A process according to claim 2 wherein the comonomer is propene.

4. A process according to claim 1 wherein the polymerization is conducted at 70°-100° C.

5. A process according to claim 1 wherein the (a) component of the mixed catalyst is produced by the reduction of titanium tetrachloride with aluminum or ethyl aluminum sesquichloride.

6. A process according to claim 5 wherein the TiCl$_3$ . $n$AlCl$_3$ component is TiCl$_3$ . 0.3 to 0.5 AlCl$_3$.

7. A process according to claim 1 wherein the (b) component of the mixed catalyst is 90-99 molar percent of a dialkyl aluminum monochloride and 1-10 molar percent of a trialkyl aluminum.

8. A process according to claim 7 wherein the dialkyl aluminum monochloride is diethyl aluminum monochloride.

9. A process according to claim 7 wherein the trialkyl aluminum compound is triethylaluminum.

10. A process according to claim 1 wherein the mixed catalyst has a molar ratio of Al : Ti of from 1 to 3 : 1.

11. A process according to claim 10 wherein the molar ratio is from 1.5 to 2.5 : 1.

12. A process according to claim 4 wherein the (a) component of the mixed catalyst is TiCl$_3$ . 0.3-0.5 AlCl$_3$ produced by the reduction of titanium tetrachloride with aluminum or ethyl aluminum sesquichloride and the (b) component is 90-99 molar percent of diethylaluminum and 1-10 molar percent of triethylaluminum.

* * * * *